United States Patent
Aoyama et al.

(10) Patent No.: US 11,772,911 B2
(45) Date of Patent: Oct. 3, 2023

(54) CONVEYING DEVICE

(71) Applicant: Hitachi High-Tech Corporation, Tokyo (JP)

(72) Inventors: Yasuaki Aoyama, Tokyo (JP); Ryosuke Hoshi, Tokyo (JP); Satoru Kaneko, Tokyo (JP); Hiroyuki Kobayashi, Tokyo (JP); Takeshi Tamakoshi, Tokyo (JP); Katsuhiro Kambara, Tokyo (JP); Hiroshi Watanabe, Tokyo (JP); Kuniaki Onizawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 74 days.

(21) Appl. No.: 17/596,305

(22) PCT Filed: Apr. 7, 2020

(86) PCT No.: PCT/JP2020/015603
§ 371 (c)(1),
(2) Date: Dec. 7, 2021

(87) PCT Pub. No.: WO2020/250555
PCT Pub. Date: Dec. 17, 2020

(65) Prior Publication Data
US 2022/0306405 A1    Sep. 29, 2022

(30) Foreign Application Priority Data
Jun. 12, 2019  (JP) ................. 2019-109210

(51) Int. Cl.
*B65G 54/02* (2006.01)
*H02K 41/03* (2006.01)
*H02K 41/02* (2006.01)

(52) U.S. Cl.
CPC ............ *B65G 54/02* (2013.01); *H02K 41/02* (2013.01); *H02K 41/031* (2013.01); *B65G 2201/0235* (2013.01)

(58) Field of Classification Search
CPC ....... B65G 54/02; H02K 41/031; H02K 41/02
(Continued)

(56) References Cited

U.S. PATENT DOCUMENTS 10,450,151 B2 * 10/2019 Heise .................... G01N 35/04
10,564,170 B2 *  2/2020 Schneider ............. G01N 35/04
(Continued)

FOREIGN PATENT DOCUMENTS

CN     104380585     *  5/2017  ............ B65G 54/02
JP      55-68871 A       5/1980
(Continued)

OTHER PUBLICATIONS

International Search Report (PCT/ISA/210) issued in PCT Application No. PCT/JP2020/015603 dated Jul. 7, 2020 with English translation (seven (7) pages).
(Continued)

*Primary Examiner* — James R Bidwell
(74) *Attorney, Agent, or Firm* — Crowell & Moring LLP

(57) ABSTRACT

Provided is a transport device in which reliability is increased by suppressing deterioration of the transport surface and transport efficiency is increased by suppressing electrical current loss. A transport device 1 comprising a transported body having either a permanent magnet 10 or a magnetic body, and an electromagnet unit in which coils 21 are wound around teeth 25 comprising magnetic bodies, and having recesses on surfaces of the teeth 25 facing the transported body. Specifically, the surfaces of the teeth 25 facing the transported body have at least two surfaces (first
(Continued)

facing surface 22, second facing surface 23, etc.) which have different distances to the transported body.

7 Claims, 13 Drawing Sheets

(58) Field of Classification Search
USPC .......................................................... 198/805
See application file for complete search history.

(56) References Cited

U.S. PATENT DOCUMENTS

| | | | |
|---|---|---|---|
| 11,204,361 B2* | 12/2021 | Birrer | ........................ G06T 7/60 |
| 2014/0234065 A1 | 8/2014 | Heise et al. | |
| 2017/0101277 A1 | 4/2017 | Malinowski | |
| 2017/0160299 A1* | 6/2017 | Schneider | ................. H01F 5/04 |

FOREIGN PATENT DOCUMENTS

| | | | |
|---|---|---|---|
| JP | 62-100161 | A | 5/1987 |
| JP | 6-16239 | A | 1/1994 |
| JP | 2011-199936 | A | 10/2011 |
| JP | 2017-77971 | A | 4/2017 |
| JP | 2017-102103 | A | 6/2017 |
| WO | WO 2018/208658 | A1 | 11/2018 |
| WO | WO 2019/058735 | A1 | 3/2019 |

OTHER PUBLICATIONS

Japanese-language Written Opinion (PCT/ISA/237) issued in PCT Application No. PCT/JP2020/015603 dated Jul. 7, 2020 (three (3) pages).
Extended European Search Report issued in European Application No. 20823286.8 dated Jun. 12, 2023 (11 pages).

* cited by examiner

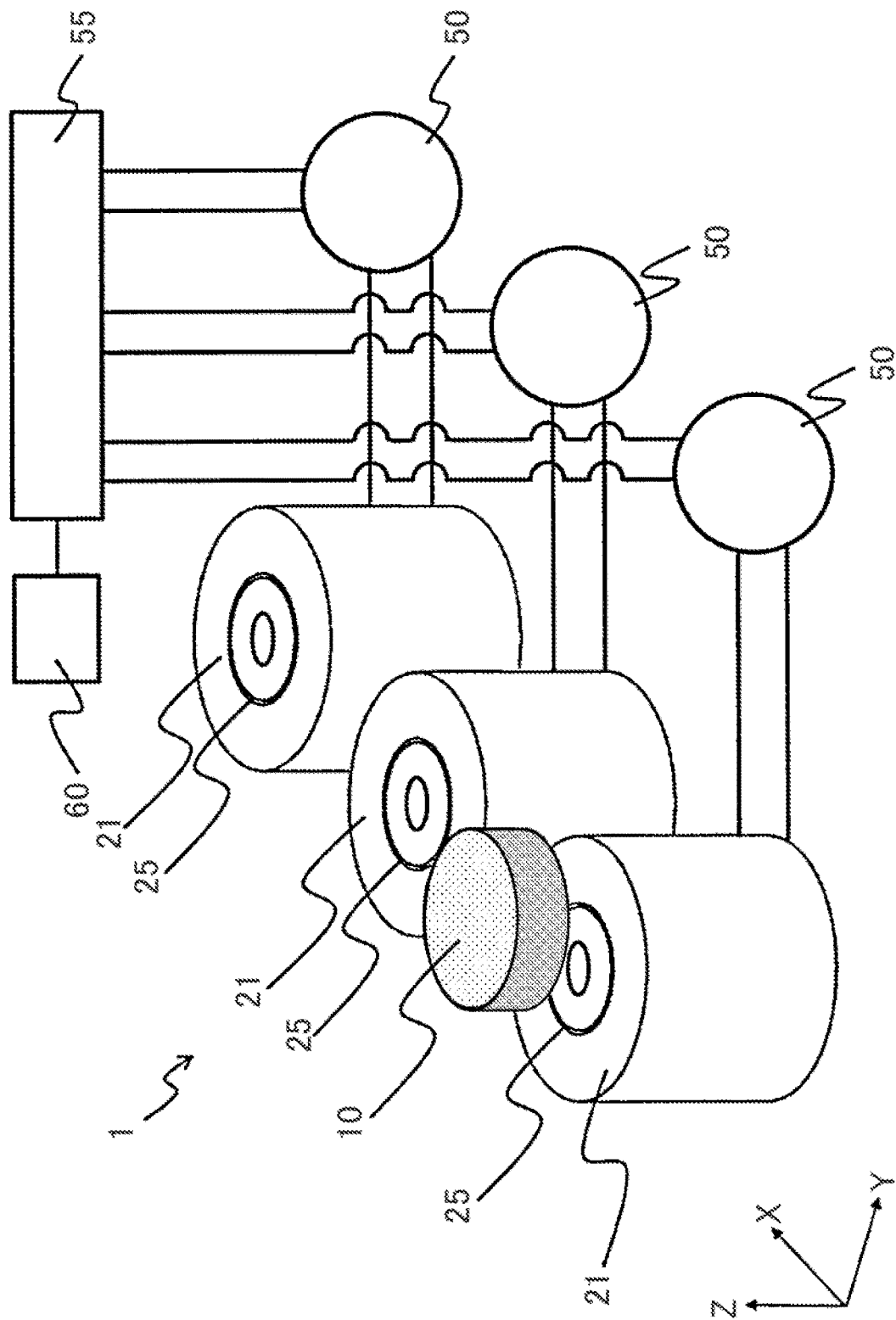

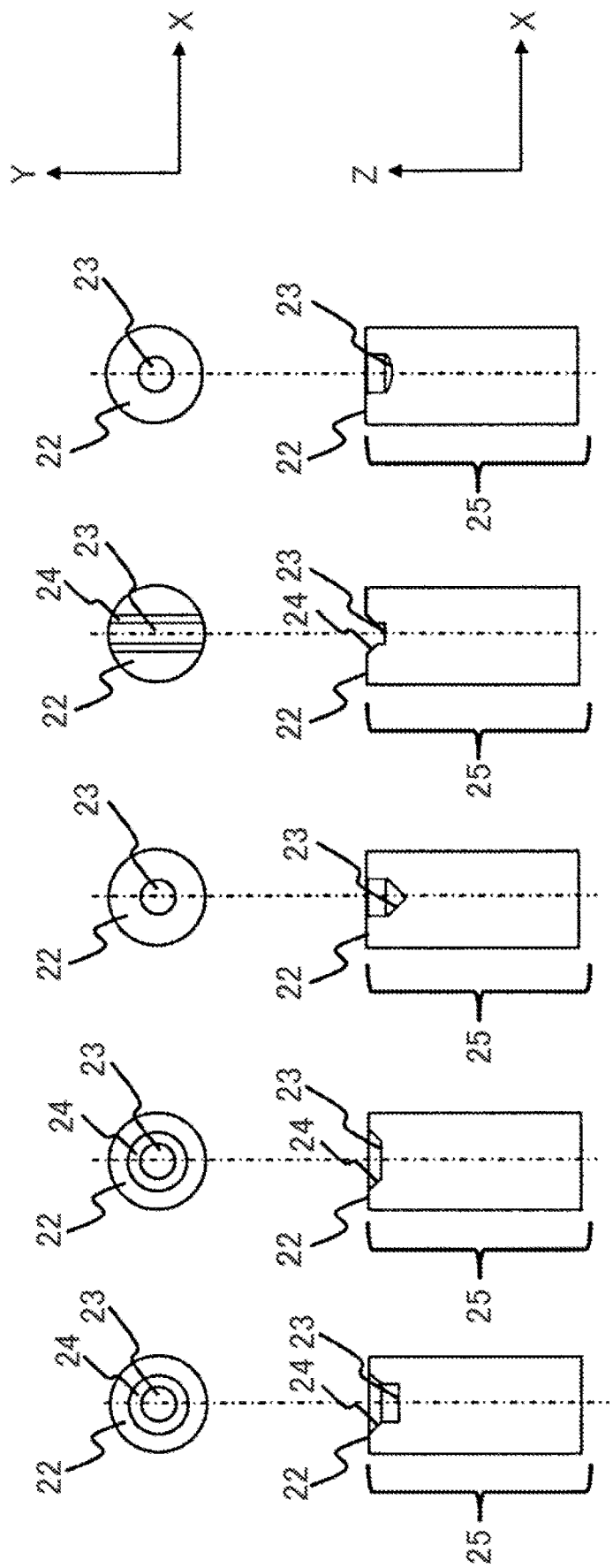

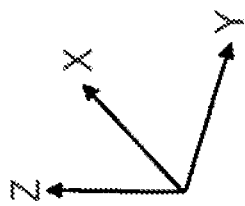
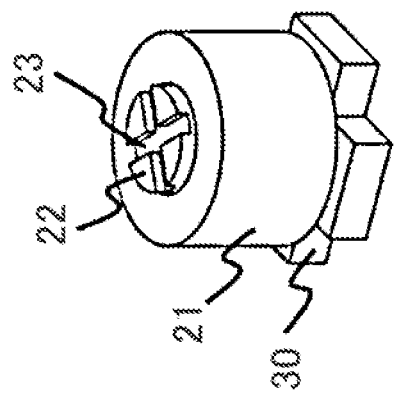
FIG. 8C
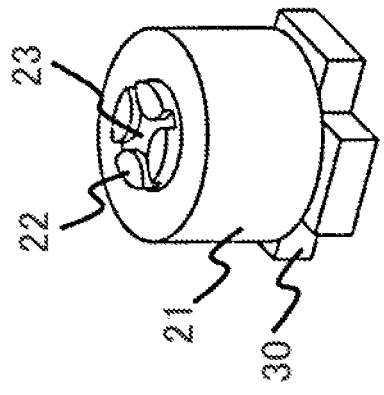
FIG. 8F
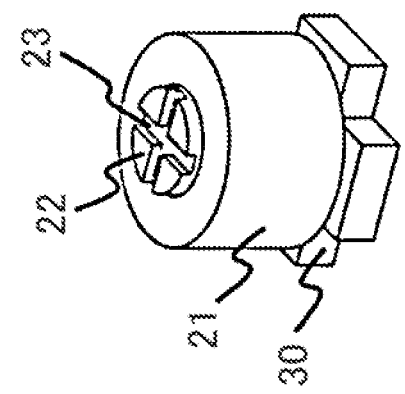
FIG. 8B
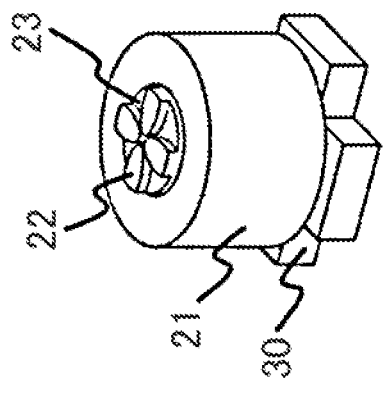
FIG. 8E
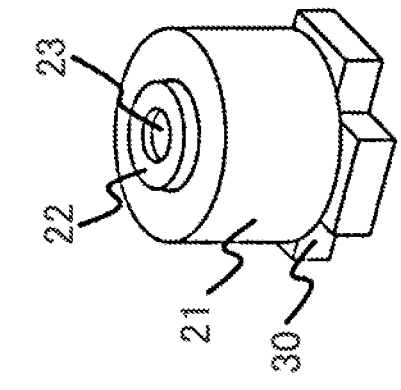
FIG. 8A
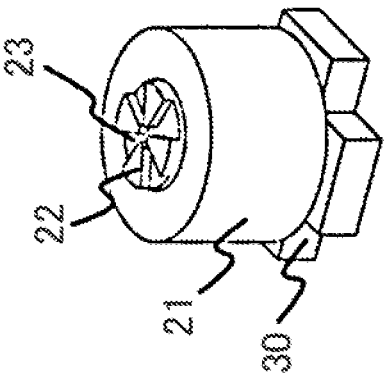
FIG. 8D

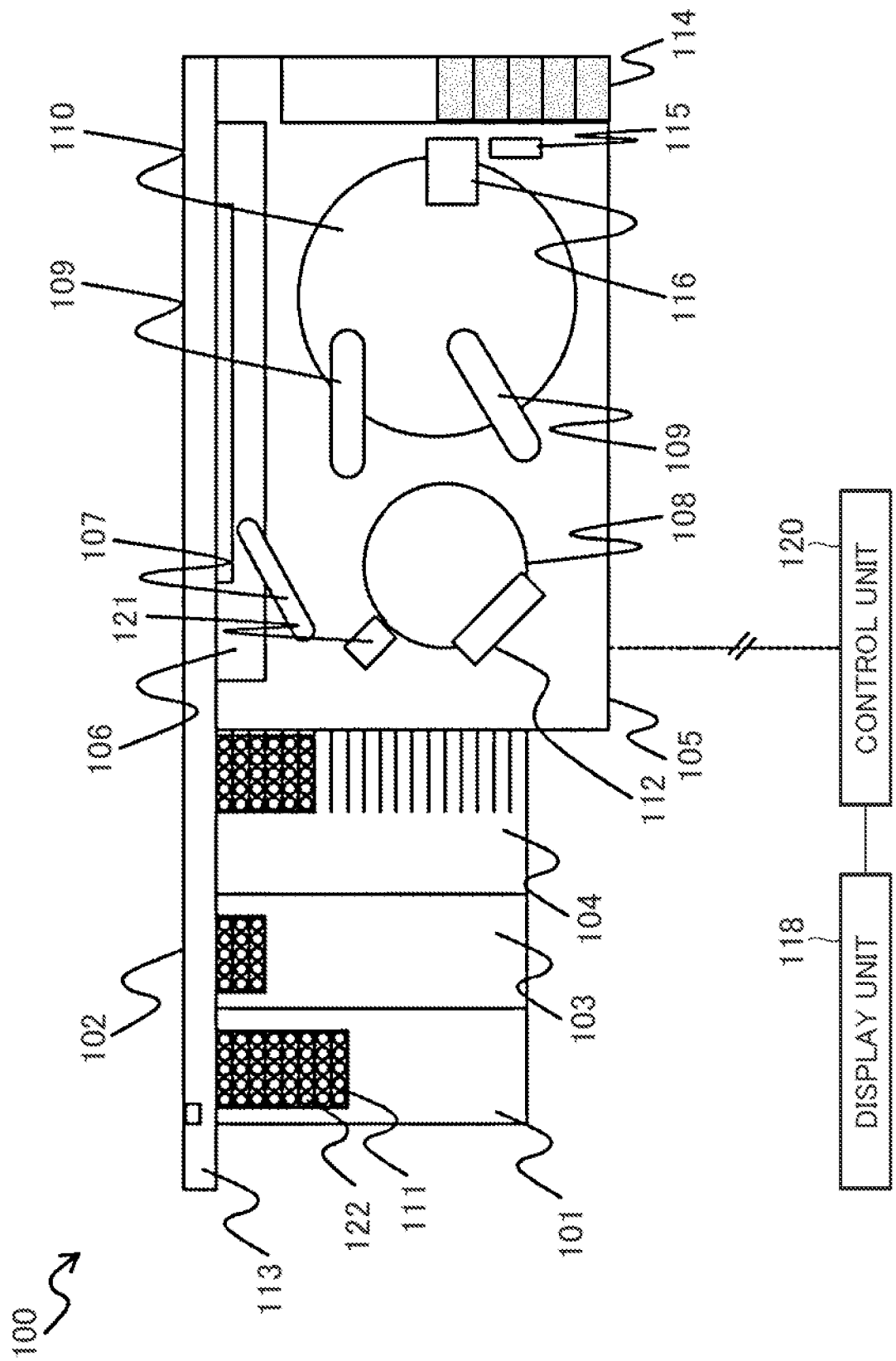

CONVEYING DEVICE

TECHNICAL FIELD

The present invention relates to a conveying device.

BACKGROUND ART

In a sample analysis system, in order to inspect instructed analysis items for inspected body (sample) such as blood, blood plasma, blood serum, urine, and other body fluid, devices having plural functions are connected and respective steps are processed automatically. That is to say, in the sample analysis system, analysis units of plural analysis fields such as biochemistry and immune are connected in the conveying line and are operated as one apparatus. Also, in order to improve the processing capacity of such sample analysis system, high speed conveying, large volume simultaneous conveying, and conveying to plural directions of the sample are desired.

With respect to such conveying device of the samples, there are Patent Literatures 1, 2 described below for example. In Patent Literatures 1, there is described "a number of container carriers each comprising at least one magnetically active device, preferably at least one permanent magnet, and adapted to carry a sample container; a transport plane adapted to carry the container carriers; and a number of electromagnetic actuators arranged stationarily below the transport plane, and adapted to move the container carrier on top of the transport plane by applying a magnetic force to the container carrier." Also, in Patent Literatures 2, there is described "A plurality of electromagnetic actuators is provided and each electromagnetic actuator comprises a ferromagnetic core and an excitation winding. Each excitation winding exceeds its assigned ferromagnetic core."

CITATION LIST

Patent Literature

Patent Literature 1: JP-A No. 2017-077971
Patent Literature 2: JP-A No. 2017-102103

SUMMARY OF INVENTION

Technical Problem

However, according to the conveying devices described in Patent Literatures 1, 2 described above, the friction force between the conveying surface and the container carrier becomes too large to ignore because of the suction force between the container carrier and the ferromagnetic core. When the friction force increased, there were possibilities that the conveying surface deteriorated due to the friction and that it was required to feed electric current large enough to resist the friction force.

The object of the present invention is to provide a conveying device that enhances reliability by inhibiting a conveying surface from deteriorating and increases conveying efficiency by inhibiting current loss.

Solution to Problem

In order to achieve the object described above, the present invention is a conveying device that includes: a conveyed object having a or a magnetic material; and an electromagnet unit formed by a coil around teeth comprised of a magnetic material, and has a recess on a surface of each of the teeth that faces the conveyed object.

Advantageous Effects of Invention

According to the present invention, there can be provided a conveying device that enhances reliability by inhibiting a conveying surface from deteriorating and increases conveying efficiency by inhibiting current loss.

BRIEF DESCRIPTION OF THE DRAWINGS

FIG. 6 is a view showing an outline of a conveying device according to the first embodiment of the present invention.

FIGS. 7A to 7E are views showing shapes of teeth according to a second embodiment of the present invention.

FIGS. 8A to 8F are views showing shapes of teeth according to a third embodiment of the present invention.

FIG. 11 is a view showing an example of a sample analysis apparatus according to a fourth embodiment of the present invention.

DESCRIPTION OF EMBODIMENTS

Embodiments of the present invention will be explained referring to FIG. 1 to FIG. 13.

First Embodiment

Figure 1:
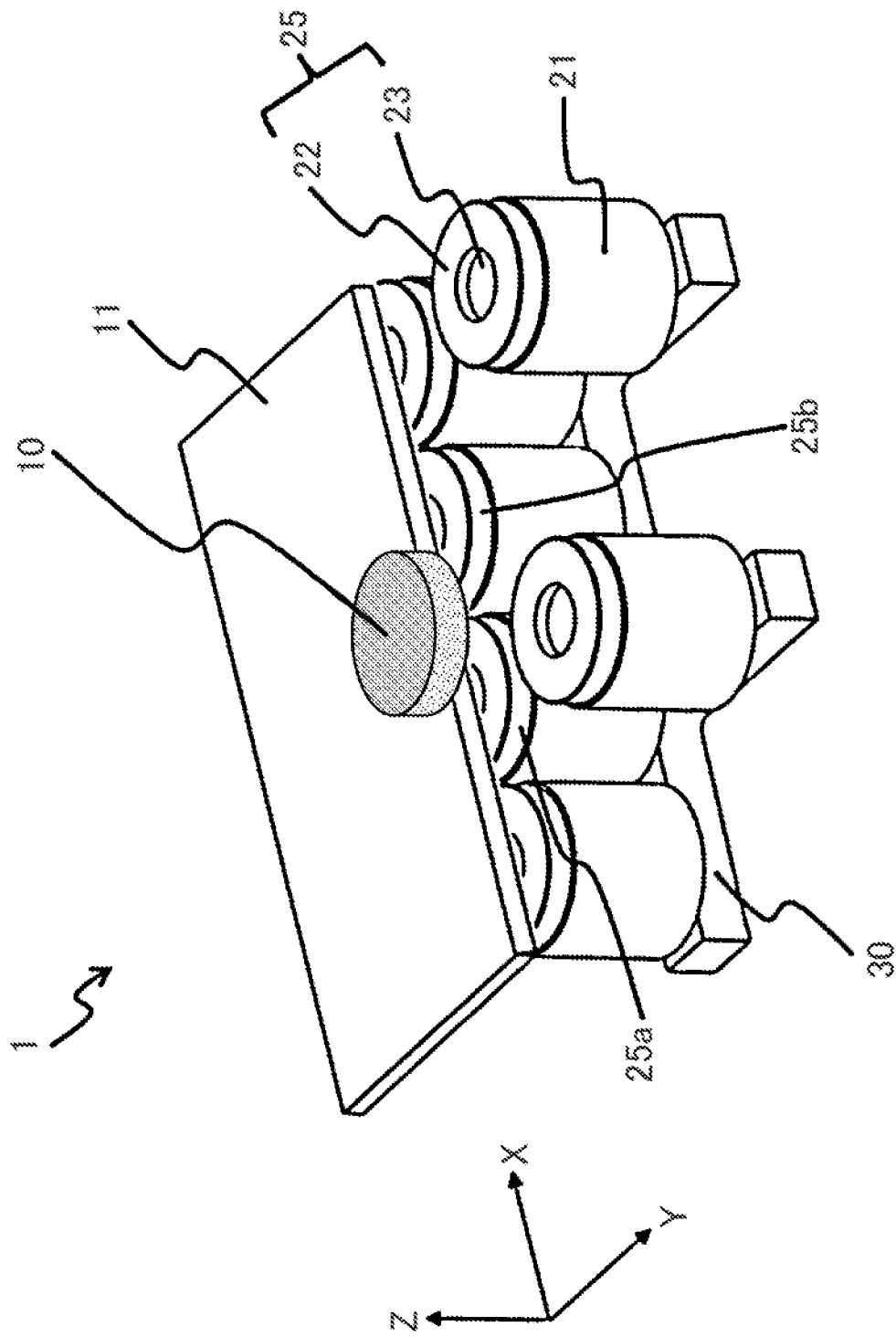
FIG. 1 is a view showing a main part configuration of a conveying device according to a first embodiment of the present invention.

The first embodiment of the present invention will be hereinafter explained. FIG. 1 is a view showing a main part configuration of a conveying device 1. The conveying device 1 includes a conveyed object (not illustrated) and an electromagnetic unit, the conveyed object including a magnetic material or a permanent magnet 10, the electromagnetic unit being formed by a coil 21 around tooth 25 formed of a magnetic material, and the conveyed object and the electromagnetic units move relatively, the electromagnetic units being arrayed by plural numbers. Usually, the electromagnetic units are fixed, and the conveyed object moves on the upper surface of a conveying surface 11 arranged on the upper surface of the electromagnetic units.

As an example of the conveyed object provided with the permanent magnet 10, there are sample holders and a sample rack, each of the sample holders holding one sample container, the sample rack holding plural sample containers. The permanent magnets 10 are incorporated to these sample holders and sample rack in an integral manner, and the sample container, the sample holders and the sample rack are conveyed to a desired position by conveying the permanent magnets 10.

Also, in each of the teeth 25, a first facing surface 22 and a second facing surface 23 are arranged on the surfaces of the side facing the permanent magnet 10. Further, each of the teeth 25 is fixed to a yoke 30 at equal intervals. The permanent magnet 10 is preferably a permanent magnet of neodymium, ferrite, and the like, but may be configured of other magnets or a soft magnetic material. Also, the permanent magnet 10 may be configured of a combination of a permanent magnet and a soft magnetic material. A drive circuit (not illustrated) is connected to the coil 21 arranged in plural number of the teeth 25. When an electric current is fed from the drive circuit, the magnetic flux generated by the electric current is applied to the permanent magnet 10 through the teeth 25 and moves the conveyed object in X direction, Y direction, or XY direction.

For example, when the permanent magnet 10 is located right above (Z direction) the tooth 25a, in order to move the permanent magnet 10 in X direction, the electric current is fed to the coil 21 of the tooth 25b, and the magnetic flux generated in the tooth 25b by the electric current and the magnetic flux of the permanent magnet 10 are made to draw each other. By executing such event consecutively in the tooth 25 and the coil 21 of the direction along which the permanent magnet 10 is intended to advance, the permanent magnet 10 can be moved in an arbitrary direction.

In general, when the area of the teeth on the side facing the permanent magnet is enlarged, the force of moving the permanent magnet in the lateral direction, namely the thrust (the force in X direction), can be increased. On the other hand, the force to draw the permanent magnet toward the teeth, namely the suction force (the force in −X direction), is also increased simultaneously. This suction force becomes a friction force between the permanent magnet and the conveying surface, and causes deterioration and wear of the conveying surface. Also, when this friction force increases, a larger thrust is required, a larger electric current must be fed in order to obtain a large thrust, and such problems are caused that a large current capacity is required in the drive circuit and a loss by a large electric current occurs.

Figure 2:
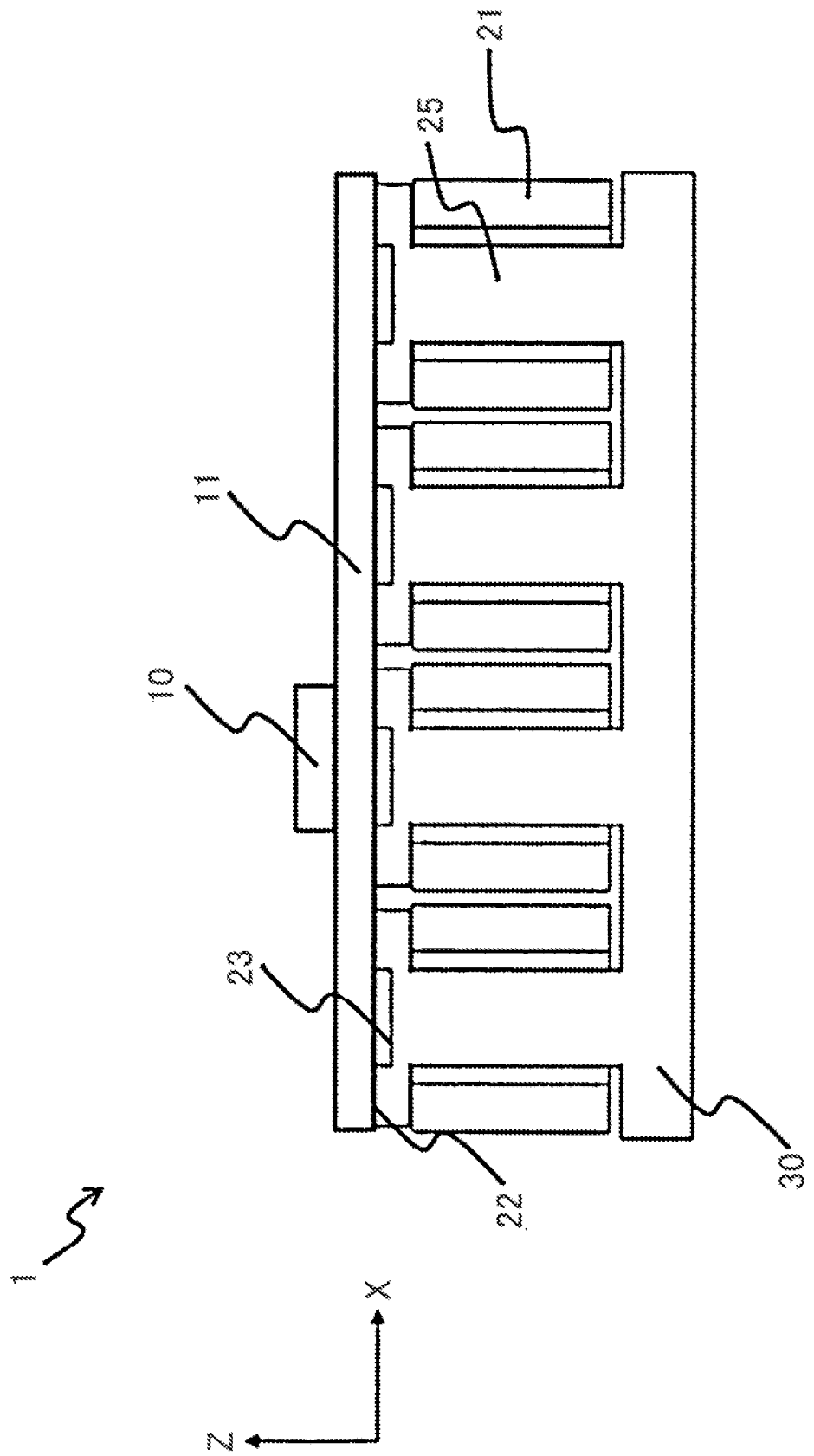
FIG. 2 is a schematic sectional view of the conveying device 1 taken along a plane Z-X shown in FIG. 1.

FIG. 2 is a schematic sectional view of the conveying device 1 taken along a plane Z-X shown in FIG. 1. The upper surface of the tooth 25 includes two surfaces of a surface closer to the permanent magnet 10 (the first facing surface 22) and a surface farther from the permanent magnet 10 (the second facing surface 23). The first facing surface 22 and the second facing surface 23 in the present embodiment are surfaces parallel to the conveying surface, but may be surfaces not parallel to each other or may not be flat surfaces.

Figure 3:
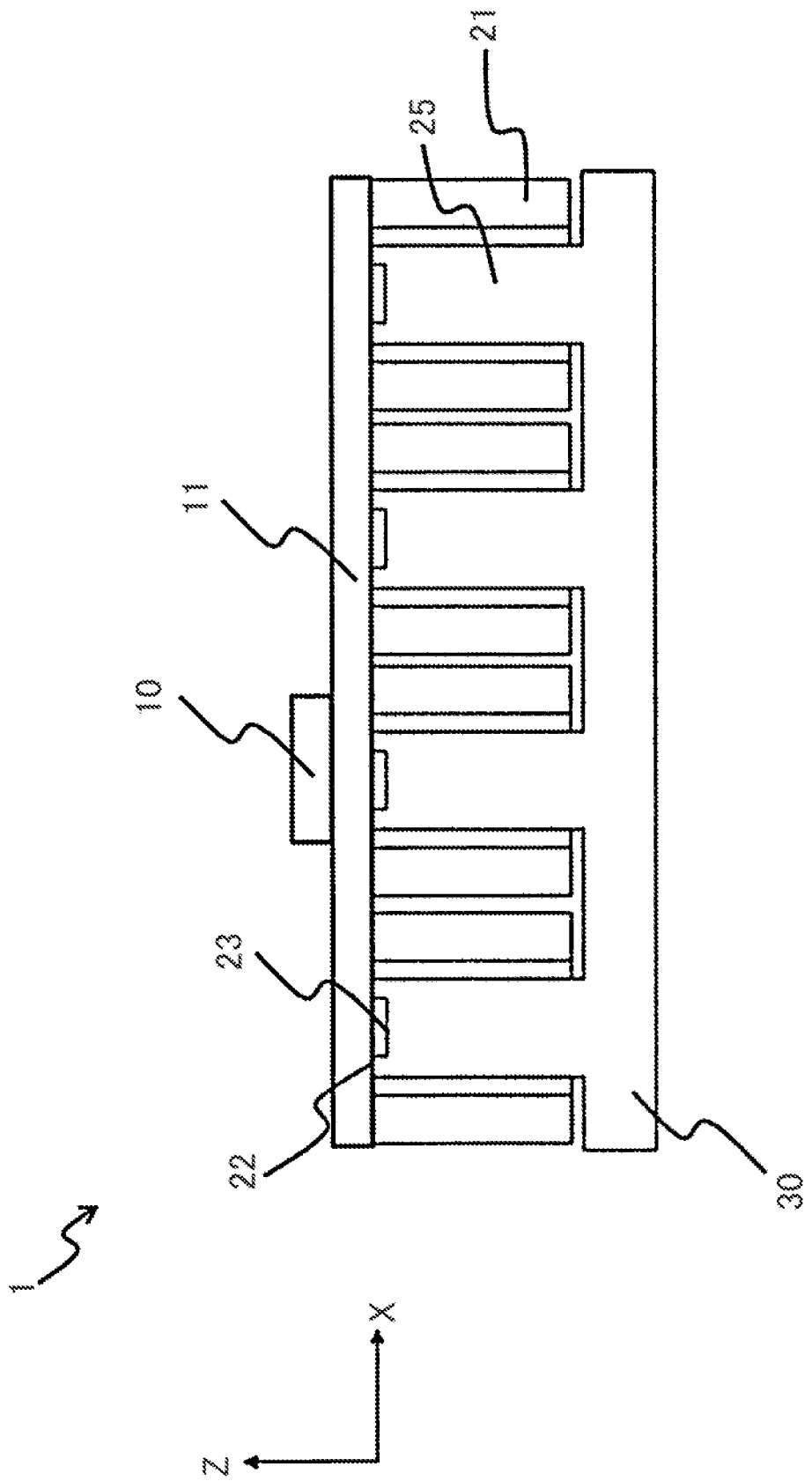
FIG. 3 is a view showing a modified example of FIG. 2.

FIG. 3 is a view showing a modified example of FIG. 2. This configuration of FIG. 3 is common with the configuration of FIG. 2 in terms of including the first facing surface 22 and the second facing surface 23 having different distance from the permanent magnet 10.

However, different from the configuration of FIG. 2, in the configuration of FIG. 3, the upper surface of the tooth 25 also is arranged to be located inside the coil 21. Further, although the upper surface of the coil 21 contacts the conveying surface 11 in FIG. 3, it is also possible to arrange a gap between the coil 21 and the conveying surface 11 to prevent heat from the coil 21 from being transferred to the conveying surface 11. In the configuration of FIG. 3, since the area of the teeth upper surface on the side facing the permanent magnet 10 is smaller compared to that of the configuration of FIG. 2, the thrust and the suction force become smaller, but there is an advantage that manufacturing can be of low cost.

Figure 4:
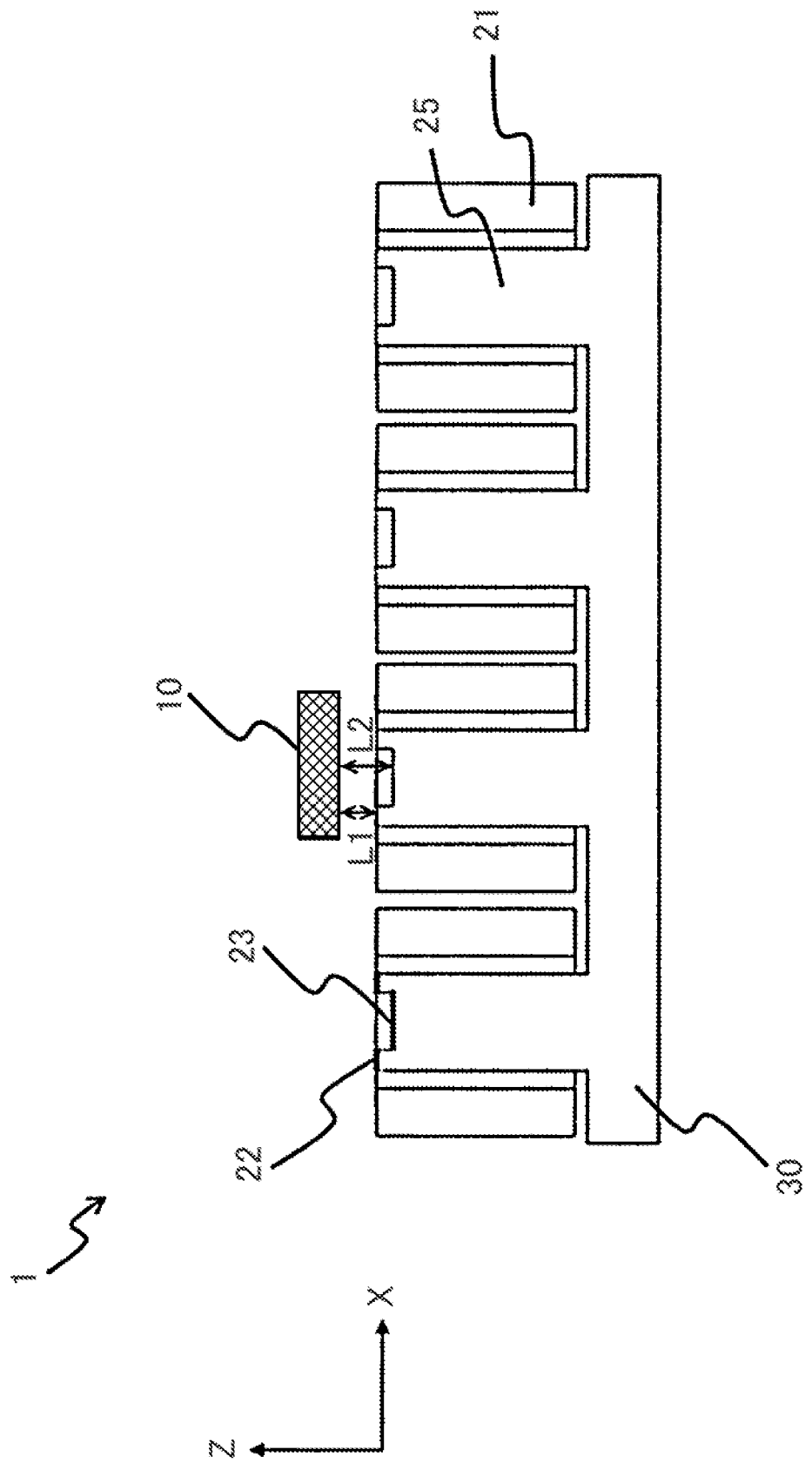
FIG. 4 is a view showing distances from a permanent magnet to surfaces of teeth.

FIG. 4 is a view showing distances from the permanent magnet 10 to the surfaces of the teeth. Also, the distance from the permanent magnet 10 to the surfaces of the teeth can be deemed to be substantially equal to the distance from the conveyed object to the surfaces of the teeth. According to the present embodiment, when the distance between the permanent magnet 10 and the first facing surface 22 in Z direction is made L1 and the distance between the permanent magnet 10 and the second facing surface 23 in Z direction is made L2, L1<L2. Here, it is also possible that the lower surface of the permanent magnet 10 is not a flat surface and that another magnetic material is arranged on the lower surface of the permanent magnet 10. In such cases, a surface along which the permanent magnet 10 moves in parallel (the conveying surface 11 for example) is made the reference, and the distances from the surface can be made L1, L2 respectively.

Figure 5:
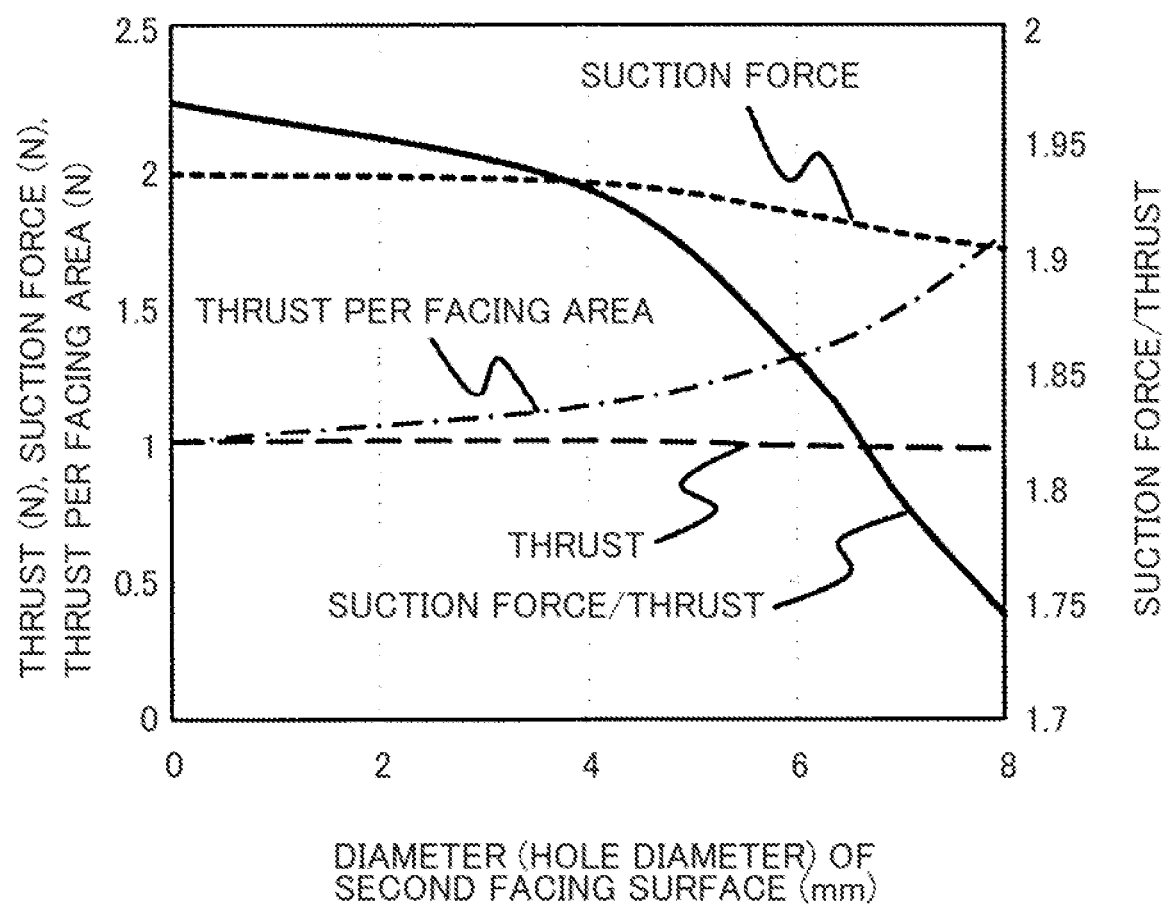
FIG. 5 is a graph showing forces (thrust, suction force, suction force per thrust, thrust per area) acting on a permanent magnet.
Figure 9D:
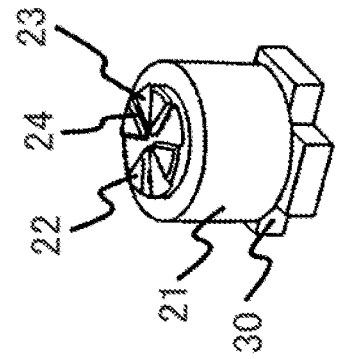
FIGS. 9A to 9H are views each showing third facing surfaces of teeth according to the third embodiment of the present invention.
Figure 9C:
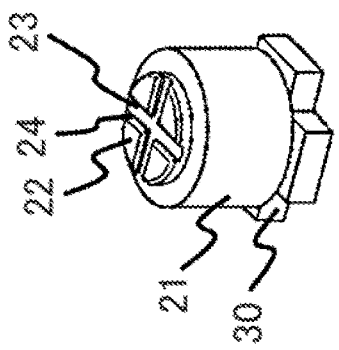
Figure 9B:
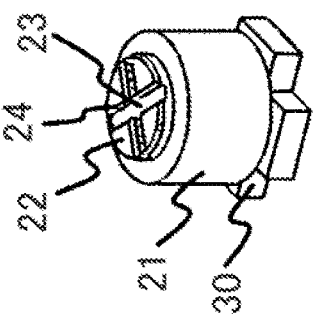
Figure 9A:
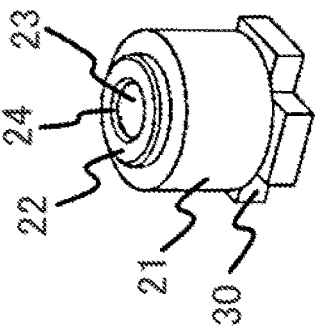
Figure 9H:
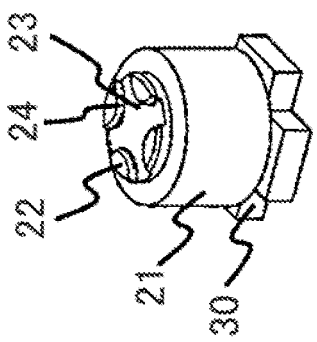
Figure 9G:
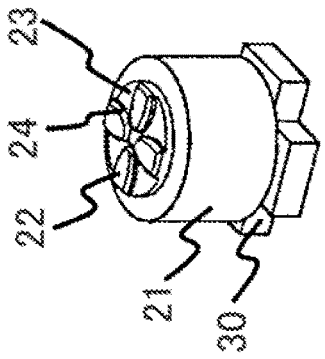
Figure 9F:
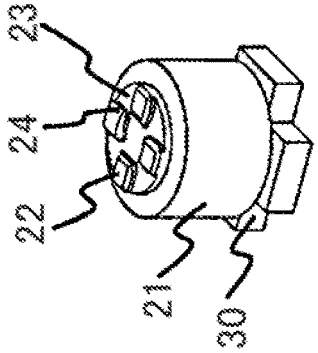
Figure 9E:
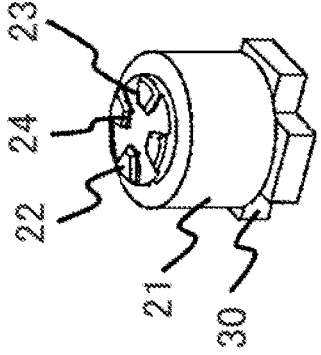

FIG. 5 shows the relation of the thrust (the force in X direction), the suction force (the force in −Z direction), the suction force per the thrust (suction force/thrust), and the thrust per the area of the first facing surface 22 close to the permanent magnet 10 acting on the permanent magnet 10 respectively in the conveying device 1 shown in FIG. 1. The vertical axis in FIG. 5 shows the maximum value of each force when the permanent magnet 10 moves from right above the tooth of the origin of the movement to right above the tooth of the destination of the movement in a case a constant electric current is fed to the coil 21 wound around the tooth 25 of the direction to which the permanent magnet 10 is going to move. The horizontal axis in FIG. 5 shows the diameter (hole diameter) of the second facing surface 23. As a premise, the diameter of the first facing surface 22 is commonly 18 mm. The hole diameter is 0 shows a state that there is no hole, namely a state that there are no facing surfaces having different distance (conventional example).

As shown in FIG. 5, the relation of each force changes according to the hole diameter. As a force applied to the permanent magnet 10, in general, the suction force is larger than the thrust. Also, as the hole diameter becomes larger, both of the thrust and the suction force reduce. However, since the rate of reduction of the suction force is larger compared to reduction of the thrust, as the hole diameter becomes larger, the suction force per the thrust (suction force/thrust) reduces. That is to say, the conveying device 1 having small suction force with respect to the thrust can be configured. Also, the thrust per the area of the first facing surface 22 close to the permanent magnet 10 also increases as the hole diameter becomes larger.

As a result, when the hole diameter is increased, the suction force per the thrust can be reduced, friction between the permanent magnet 10 and the conveying surface 11 caused by the suction force can be inhibited, and the conveying device 1 having high reliability can be achieved.

Also, according to FIG. 5, it is known that, when the diameter of the second facing surface 23 exceeds 6 mm, the suction force per the thrust sharply reduces and the thrust per the area of the first facing surface 22 sharply increases. Therefore, it is preferable that the diameter of the second facing surface 23 is made equal to or greater than ⅓ of the diameter of the first facing surface 22. However, when the diameter of the second facing surface 23 exceeds ½ of the diameter of the first facing surface 22, the area of the first facing surface 22 becomes small and the thrust itself becomes of shortage. Accordingly, it is preferable that the diameter of the second facing surface 23 is made equal to or greater than ⅓ and equal to or less than ½ of the diameter of the first facing surface 22.

Here, when the permanent magnet 10 is positioned right above the center of the tooth 25, the suction force applied to the permanent magnet 10 becomes maximum. However, by bringing the second facing surface 23 far from the permanent magnet 10 to a position closer to the center of the tooth 25 than the first facing surface 22 as the present embodiment, there is also an effect of inhibiting the maximum value of the suction force. Further, according to the present embodiment, although the second facing surface 23 forming a recess on the tooth surface facing the permanent magnet 10 (conveyed object) has a circular shape and the first facing surface 22 positioned on the outside diameter side of this second facing surface 23 has an annular shape, the second facing surface 23 may not be in a circular shape.

FIG. 6 is a view showing an outline of the conveying device 1 of the present embodiment. A drive circuit 50 is connected to the coil 21 arranged in each of the teeth 25, and it is configured that, by applying voltage from the drive circuit 50, the electric current flows through the coil 21 and the thrust is generated. Here, the electric current fed to the coil 21 by the drive circuit 50 is calculated and determined by an arithmetic unit 55 using the positional information of the permanent magnet 10 obtained by a position detector 60.

Second Embodiment

The second embodiment of the present invention will be hereinafter explained. FIG. 7 shows various examples of the shape of the tooth 25 having the first facing surface 22 and the second facing surface 23 having different distance from the permanent magnet 10. The present embodiment is different from the first embodiment only in the shape of the facing surface of the tooth 25, and the configuration as the conveying device 1 is similar to that of the first embodiment. The basic effect of each shape shown in the present embodiment is common in terms that the suction force per the thrust can be reduced, and explanation will be hereinafter given with respect to other effects of each shape.

In the shape shown in FIG. 7A, between the first facing surface 22 close to the permanent magnet 10 and the second facing surface 23 far from the permanent magnet 10, there is arranged a third facing surface 24 whose distance from the permanent magnet 10 is intermediate. As shown in FIG. 7A, with respect to the third facing surface 24, the distance to the permanent magnet 10 may gradually change, and it is also possible that the third facing surface 24 may be formed parallel to the permanent magnet 10 and may be formed by a curved surface. Thus, by arranging the third facing surface 24 between the first facing surface 22 and the second facing surface 23, change of the magnetic flux applied to the permanent magnet 10 can be relaxed. Therefore, sharp change of the thrust and the suction force is reduced, local deterioration of the conveying surface 11 and vibration of the permanent magnet 10 can be prevented, and the noise of the conveying device 1 can be inhibited. Also, the face formed between the first facing surface 22 and the second facing surface 23 may not only be the third facing surface 24 but may also exist other than the third facing surface 24.

As shown in FIG. 7B, the third facing surface 24 may also be configured that the distance from the permanent magnet 10 changes continuously from the first facing surface 22 to the second facing surface 23. According to the configuration of FIG. 7B, there is no place where the distance from the permanent magnet 10 changes largely, and the noise of the conveying device 1 further reduces. Also, according to the configuration of FIG. 7B, since the distance between the second facing surface 23 and the permanent magnet 10 can be made smaller compared to the configuration of FIG. 7A, the thrust and the suction force can be secured easily.

FIG. 7C is an example in which the distance from the permanent magnet 10 is changed gradually with respect to the second facing surface 23. The configuration of FIG. 7C has an advantage that manufacturing is easier compared to other configurations. Further, it is also possible to configure that the distance from the permanent magnet 10 changes gradually with respect to the first facing surface 22.

Also, as shown in FIG. 7A to FIG. 7C, by arranging the second facing surface 23 in a generally circular shape so that the first facing surface 22 surrounds the second facing surface 23, equal characteristics can be secured in all directions with respect to the tooth 25. That is to say, according to the configurations of FIG. 7A to FIG. 7C, there is an advantage that a similar effect can be secured in any directions such as X direction, Y direction, and XY direction when the tooth 25 is seen from the top.

In FIG. 7D, the second facing surface 23 having a shape linear in Y direction is arranged instead of the second facing surface having a circular or elliptic shape. By being configured thus, the thrust in X direction becomes large, and the thrust in Y direction becomes smaller compared to that in X direction. For example, when the conveyed object where the permanent magnet 10 is embedded is to be conveyed mainly in X direction, it does not matter even when the thrust in Y direction mat be small. According to the configuration of FIG. 7D, the suction force per the thrust can be reduced relatively. Also, by arranging the third facing surface 24 between the first facing surface 22 and the second facing surface 23 in parallel along Y direction, movement in Y direction can be stabilized. Further, by arranging the third facing surface 24 whose distance to the permanent magnet 10 continuously changes from the first facing surface 22 to the second facing surface 23, change of the magnetic flux applied to the permanent magnet 10 during movement in X direction can be relaxed. Therefore, sharp change of the thrust and the suction force is reduced, local deterioration of the conveying surface 11 and vibration of the permanent magnet 10 can be prevented, and the noise of the conveying device 1 can be inhibited.

FIG. 7E is an example where the second facing surface 23 is configured to have a spherical shape. Similar to other configurations of FIG. 7, since the distance between the permanent magnet 10 and the facing surface gradually changes, change of the magnetic flux applied to the permanent magnet 10 can be relaxed, and sharp change of the thrust and the suction force can be reduced. Therefore, local deterioration of the conveying surface 11 and vibration of the permanent magnet 10 can be prevented, and the noise of the conveying device 1 can be inhibited.

Third Embodiment

The third embodiment of the present invention will be hereinafter explained. FIG. 8 shows other examples of the shape of the tooth 25 having the first facing surface 22 and the second facing surface 23 having different distance to the permanent magnet 10. The present embodiment is different from the first embodiment only in the shape of the facing surface of the tooth 25, and the configuration as the conveying device 1 is similar to that of FIG. 1. In the present embodiment, explanation will be given on the effect of changing the shape of the first facing surface 22 and the second facing surface 23 in each tooth. The basic effect of each shape shown in the present embodiment is common in terms that the suction force per the thrust can be reduced, and other effects of each shape will be hereinafter explained.

FIG. 8A has a construction that the first facing surface 22 is arranged on the outer peripheral side whereas the second facing surface 23 is arranged on the inner peripheral side. According to this configuration, it is possible to generate the thrust characteristics generally equal over the directions of 360° on XY plane.

FIG. 8B is an example of arranging the second facing surface 23 in a cross shape, and the directions of the grooves in the cross shape are directed to X direction and Y direction respectively. That is to say, the first facing surface 22 is formed in the position of XY direction. Therefore, when the permanent magnet 10 moves in XY direction, change of the area of the tooth facing the permanent magnet 10 becomes gentle, and change of the magnetic flux applied to the permanent magnet 10 can be relaxed. That is to say, according to this configuration, the thrust in a diagonal direction (XY direction) can be obtained stably.

Though FIG. 8C also is an example of arranging the second facing surface 23 in a cross shape, the directions of the grooves in the cross shape are directed to diagonal directions (XY direction) respectively. That is to say, according to this configuration, since the first facing surface 22 is formed in X direction and Y direction, the thrust in X direction and Y direction can be obtained stably.

All of FIGS. 8D to 8F are examples of forming the first facing surface 22 in X direction and Y direction, and the thrust in X direction and Y direction can be obtained stably in a similar manner to FIG. 8C. However, the shape of the first facing surface 22 is a triangle shape in FIG. 8D, a flower petal shape in FIG. 8E, and an arc shape in FIG. 8F.

According to all of the teeth construction shown in FIGS. 8B to 8F in the present embodiment, the second facing surface 23 is formed into a radial shape of extending from the center to the outer diameter side in plural numbers, and it is possible to stably obtain the thrust in specific directions. Therefore, it can be said that such construction is suitable to a case of a conveying device where the conveyed object moves only in a specific direction.

FIGS. 9A to 9H show construction examples of arranging the third facing surface 24 between the first facing surface 22 and the second facing surface 23. According to such configuration, change of the magnetic flux applied to the permanent magnet 10 is further relaxed.

Figure 10B:
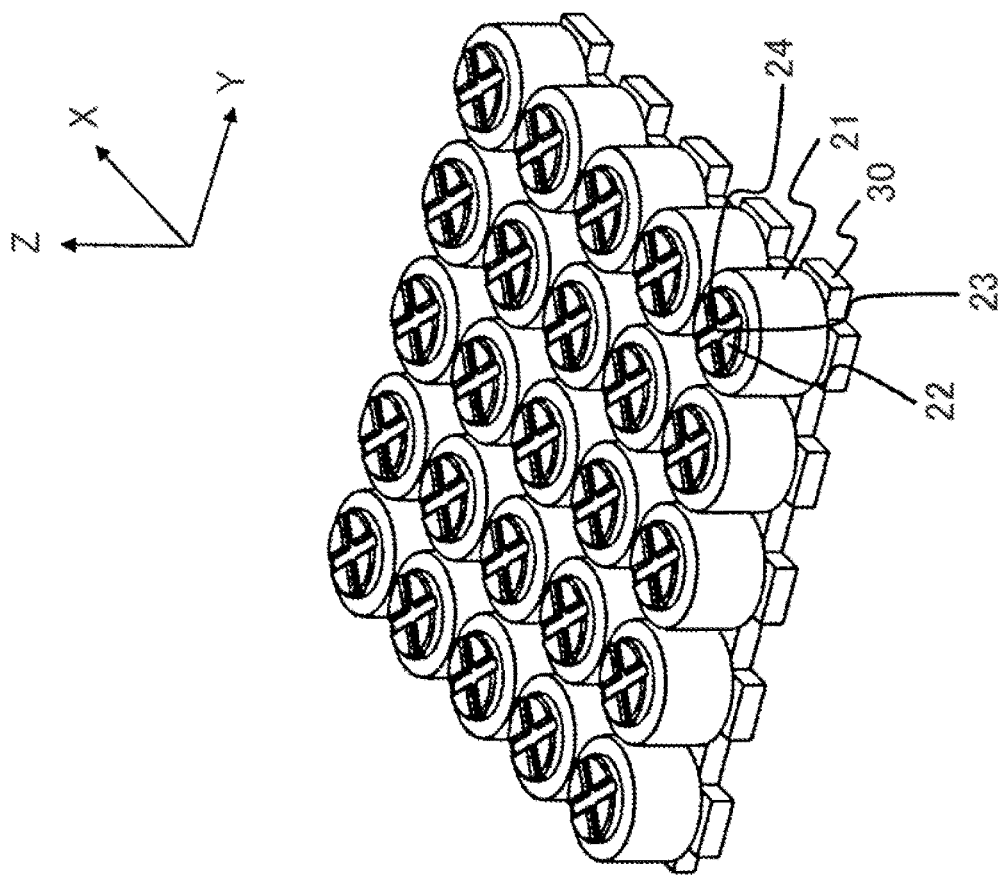
FIGS. 10A and 10B are views each showing conveying device of which has twenty-five teeth according to the third embodiment of the present invention.
Figure 10A:
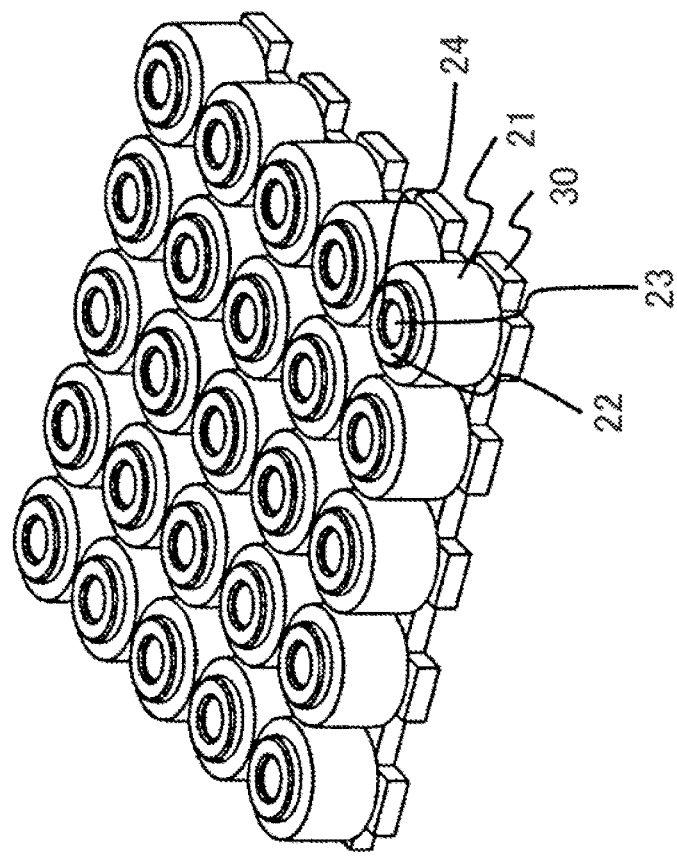

FIG. 10A is an example of the conveying device 1 arranging twenty-five pieces (5 pieces×5 pieces) of teeth including the second facing surface 23 having a circular shape. Respective teeth are joined by the yoke 30, and a coil 31 is arranged in each of the teeth.

FIG. 10B is an example of the conveying device 1 similarly arranging twenty-five pieces of teeth where the second facing surfaces 23 having a cross shape are formed in XY direction.

Fourth Embodiment

The present embodiment is one where the conveying device described in the first embodiment to the third embodiment is applied to a sample analysis apparatus 100 and a sample pretreatment device 150. First, the overall configuration of the sample analysis apparatus 100 will be explained using FIG. 11. FIG. 11 is a view schematically showing the overall configuration of the sample analysis apparatus 100.

In FIG. 11, the sample analysis apparatus 100 is an apparatus for dispensing a sample and a reagent to a reaction container respectively to allow the sample and the reagent to react each other and measuring a solution obtained by the reaction, and includes a carry-in unit 101, an emergency rack insertion port 113, a first conveying line 102, a buffer 104, an analysis apparatus 105, a storage unit 103, a display unit 118, a control unit 120, and the like.

The carry-in unit 101 is a place for arranging a sample rack 111, a sample container 122 being stored by a plural number in the sample rack 111, the sample container 122 storing a living specimen such as blood and urine. The emergency rack insertion port 113 is a place for inserting the sample rack 111 into the apparatus, the sample rack 111 storing a sample rack (calibration rack) and the sample container 122, the sample rack (calibration rack) being mounted with a standardized solution, the sample container 122 storing a sample requiring urgent analysis. The buffer 104 holds a plural number of the sample racks 111 conveyed by the first conveying line 102 in such manner that the dispensing order of the sample in the sample rack 111 can be changed. The analysis apparatus 105 is for analyzing a sample conveyed from the buffer 104 through a second conveying line 106, and the detail thereof will be described below.

The storage unit 103 stores the sample rack 111 storing a sample container 122 that holds a sample whose analysis having been finished by the analysis apparatus 105. The display unit 118 is a display device for displaying the analysis result of the concentration of a predetermined component in a liquid specimen such as blood and urine. The control unit 120 is configured of a computer and the like, controls operation of each mechanism within the sample analysis apparatus 100, and executes the arithmetic process for obtaining the concentration of the predetermined component in the sample such as blood and urine.

Here, the first conveying line 102 is a line for conveying the sample rack 111 arranged in the carry-in unit 101, and has a configuration similar to any one of the conveying device described in the first embodiment to the third embodiment. According to the present embodiment, a magnetic material, preferably a permanent magnet, is arranged on the back surface side of the sample rack 111 that is a conveyed object.

Also, the analysis apparatus 105 is configured of the second conveying line 106, a reaction disk 108, a sample dispensing nozzle 107, a reagent disk 110, a reagent dispensing nozzle 109, a cleaning mechanism 112, a reagent tray 114, a reagent ID reader 115, a reagent loader 116, a spectrophotometer 121, and the like.

Here, the second conveying line 106 is a line for carrying-in the sample rack 111 within the buffer 104 to the analysis apparatus 105, and has a configuration similar to any one of the conveying device described in the first embodiment to the third embodiment.

Also, the reaction disk 108 includes a plural number of reaction containers. The sample dispensing nozzle 107 dispenses a sample from the sample container 122 to a reaction container of the reaction disk 108 by rotational drive or vertical drive. The reagent disk 110 installs a plural number of reagents. The reagent dispensing nozzle 109 dispenses a reagent from a reagent bottle within the reagent disk 110 to a reaction container of the reaction disk 108.

The cleaning mechanism 112 cleans a reaction container of the reaction disk 108. The spectrophotometer 121 measures the light absorption of the reaction liquid by measuring the transmitted light obtained from a light source (not illustrated) through the reaction liquid of the reaction container. The reagent tray 114 is a member for installing a reagent in registering a reagent into the sample analysis apparatus 100. The reagent ID reader 115 is a device for acquiring the reagent information by reading a reagent ID given to a reagent installed on the reagent tray 114. The reagent loader 116 is a device for carrying-in a reagent to the reagent disk 110.

The analysis process for the sample by the sample analysis apparatus 100 as described above is executed according to the order described below.

First, the sample rack 111 is set at the carry-in unit 101 or the emergency rack insertion port 113, and is carried-in by the first conveying line 102 to the buffer 104 that allows random access.

The sample analysis apparatus 100 carries-in the sample rack 111 to the analysis apparatus 105 by the second conveying line 106, the sample rack 111 having the highest priority according to the rule of priority among the racks stored in the buffer 104.

The sample rack 111 having arrived to the analysis apparatus 105 is transferred further to a sample isolation position near the reaction disk 108 by the second conveying line 106, and the sample is isolated to the reaction container of the reaction disk 108 by the sample dispensing nozzle 107. Isolation of the sample is executed by the sample dispensing nozzle 107 by a required number of times according to the analysis item requested for the sample in question.

Isolation of the sample is executed by the sample dispensing nozzle 107 with respect to all of the sample containers 122 mounted on the sample rack 111. The sample rack 111 having finished the isolation process with respect to all of the sample containers 122 is transferred again to the buffer 104. Further, the sample rack 111 having finished all sample isolation process including automatic re-inspection is transferred to the storage unit 103 by the second conveying line 106 and the first conveying line 102.

Also, the reagent used for analysis is isolated by the reagent dispensing nozzle 109 from a reagent bottle on the reagent disk 110 to the reaction container to which the sample have been isolated in advance. Next, the mixed liquid of the sample and the reagent within the reaction container is mixed by the mixing mechanism (not illustrated).

Thereafter, the light generated from the light source is made to pass through the reaction container containing the mixed liquid after mixing, and luminosity of the transmitted light is measured by the spectrophotometer 121. The luminosity measured by the spectrophotometer 121 is transmitted to the control unit 120 through an A/D converter and an interface. Also, calculation is executed by the control unit 120, concentration of the predetermined component in the liquid specimen such as blood and urine is obtained, and the result is displayed by the display unit 118 and the like or stored in a storage unit (not illustrated).

Also, the sample analysis apparatus 100 does not have to include all configuration described above, and a unit for pretreatment may be added appropriately or a part of the units and a part of the configurations may be deleted. In this case also, the analysis apparatus 105 and the carry-in unit 101 are connected to each other by the first conveying line 102, and the sample rack 111 is conveyed from the carry-in unit 101.

Figure 12:
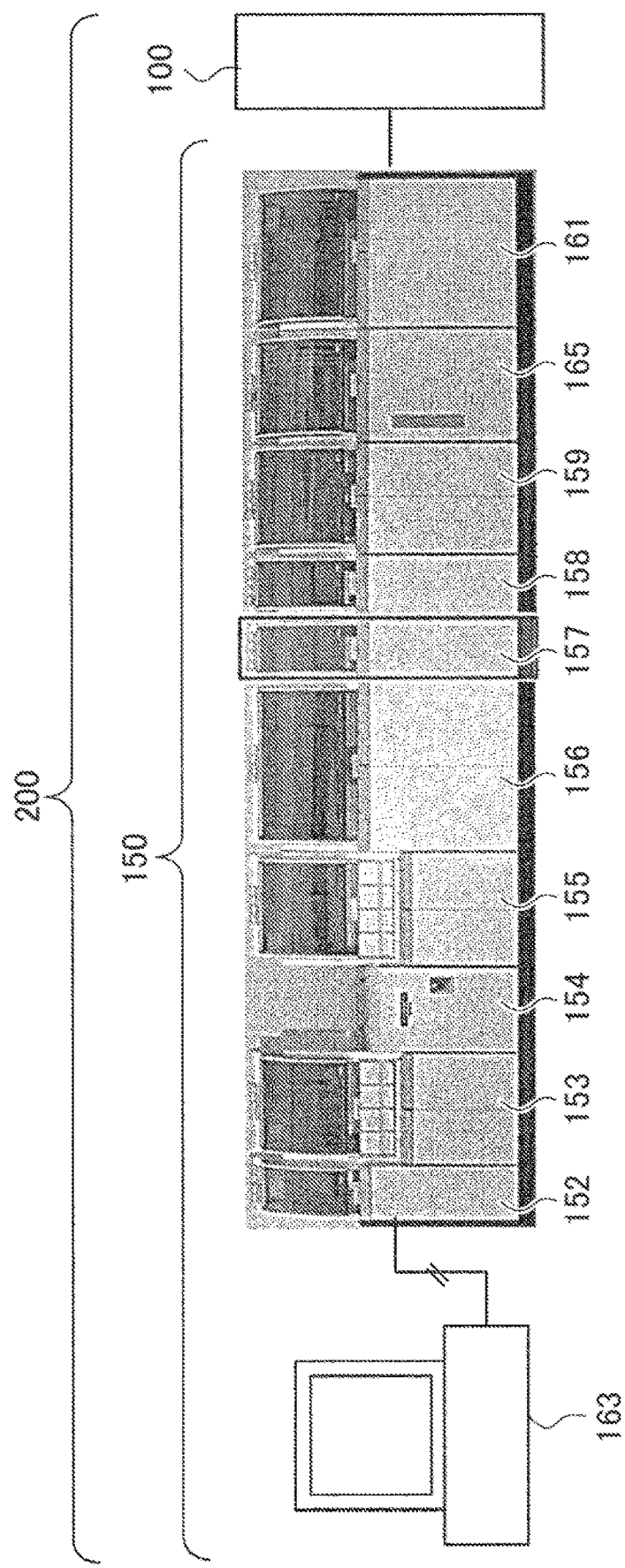
FIG. 12 is a view showing an example of a sample pretreatment device according to the fourth embodiment of the present invention.

Next, the overall configuration of the sample pretreatment device 150 will be explained using FIG. 12. FIG. 12 is a view schematically showing the overall configuration of the sample pretreatment device 150.

In FIG. 12, the sample pretreatment device 150 is a device for executing various kinds of pretreatment processes required for analysis of the sample. The sample pretreatment device 150 is configured of a plural number of units and an operation unit PC 163 controlling the operation of these plural number of units, the plural number of units having basic elements of a plugging unit 152, a sample storage unit 153, a vacant holder stacker 154, a sample insertion unit 155, a centrifugal separation unit 156, a liquid volume measurement unit 157, an unplugging unit 158, a child sample container preparation unit 159, a dispensing unit 165, and a transfer unit 161 from the left side toward the right side of FIG. 12. Also, as the destination of transfer of the sample processed by the sample pretreatment device 150, the sample analysis apparatus 100 for executing qualitative and quantitative analysis of the component of the sample is connected.

The sample insertion unit 155 is a unit for inserting the sample container 122 storing the sample into the sample pretreatment device 150. The centrifugal separation unit 156 is a unit for executing centrifugal separation with respect to the sample container 122 inserted. The liquid volume measurement unit 157 is a unit for executing liquid volume measurement of the sample stored in the sample container 122. The unplugging unit 158 is a unit for opening the plug of the sample container 122 inserted. The child sample container preparation unit 159 is a unit for executing required preparation for dispensing the sample stored in the inserted sample container 122 in the next dispensing unit 165. The dispensing unit 165 is a unit for subdividing the sample having been subjected to centrifugal separation for analysis by a sample analysis system and the like and attaching a bar code and the like to the sample container (child sample container) 122 subdivided. The transfer unit 161 is a unit for classifying the child sample container 122 dispensed and preparing for transfer to the sample analysis system. The plugging unit 152 is a unit for plugging the sample container 122 and the child sample container 122. The sample storage unit 153 is a unit for storing the sample container 122 having been plugged.

Figure 13:
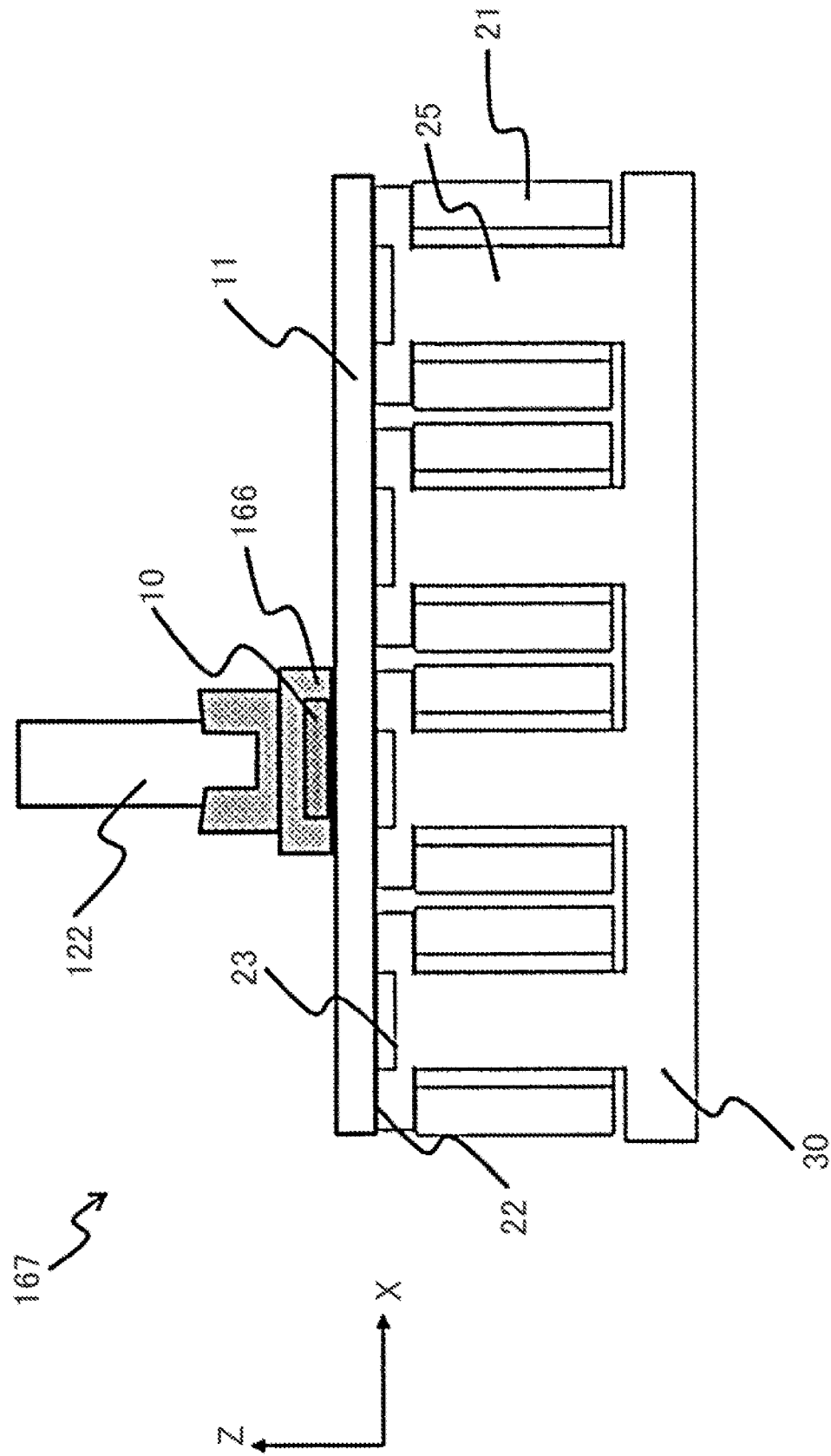
FIG. 13 is a schematic view showing a main part configuration of a third conveying line in a sample pretreatment device.

Here, in the sample pretreatment device 150, as shown in FIG. 13, a sample holder 166 holding one sample container 122 each is conveyed between each processing unit by a third conveying line 167. Also, in the transfer unit 161, the sample container 122 is transferred between a sample holder 166 and the sample rack 111 (mounting five sample containers 122), the sample holder 166 being used for conveying the sample container 122 by the third conveying line 167 in the sample pretreatment device 150, the sample rack 111 being used for conveying the sample container 122 by the first conveying line 102 in the sample analysis apparatus 100. That is to say, the sample container 122 having finished the pretreatment process in the sample pretreatment device 150 is carried out to the first conveying line 102 in the sample analysis apparatus 100 through the transfer unit 161.

Also, the sample pretreatment device 150 does not have to include all configuration described above, and a unit may be added further or a part of the units and a part of the configurations may be deleted. Further, as shown in FIG. 12, a sample analysis system 200 combining the sample pretreatment device 150 and the sample analysis apparatus 100 is also possible. In this case, not only within each device but also a device and a device are connected to each other by the conveying device described in the first embodiment to the third embodiment, and the sample container 122 can be conveyed.

In the sample analysis apparatus 100 and the sample pretreatment device 150 as well as the system combining them of the present embodiment, since such conveying device as the first embodiment to the third embodiment is included, friction between the sample rack 111 and the sample holder 166 and the conveying surface is less. As a result, it is possible to provide an apparatus or a system in which the sample container 122 can be conveyed efficiently to a destination while inhibiting the current loss, the trouble in conveying is less, and reliability is high. Also, since a force applied in the vertical direction of the sample rack 111 and the like becomes small, vibration of the sample container 122 caused by pulsation of the sample rack 111 and the like can be also reduced.

Others

Further, the present invention is not limited to the embodiments described above, and various modifications are included. The embodiments described above were explained in detail for better understanding of the present invention, and is not to be necessarily limited to one including all configurations of the explanation. Also, a part of a configuration of an embodiment can be substituted by a configuration of other embodiments, and a configuration of an embodiment can be added with a configuration of other embodiments. Further, with respect to a part of the configuration of each embodiment, it is possible to add other configurations, to be deleted, and to be substituted.

For example, in the first embodiment to the fourth embodiment, although explanation was given for a case that the conveyed object conveyed by the conveying device was the sample rack and the sample holder, the conveyed object is not limited to a rack 111 and a holder 166 holding the sample container 122, and various object requiring conveying in a large scale can be made the object of conveying.

LIST OF REFERENCE SIGNS 1 conveying device
10 permanent magnet
11 conveying surface
21 coil
22 first facing surface
23 second facing surface
24 third facing surface
25, 25a, 25b teeth
30 yoke
50 drive circuit
55 arithmetic unit
60 position detector
100 sample analysis apparatus
101 carry-in unit
102 first conveying line
103 storage unit
104 buffer
105 analysis apparatus
106 second conveying line
107 sample dispensing nozzle
108 reaction disk
109 reagent dispensing nozzle
110 reagent disk
111 sample rack (conveyed object)
112 cleaning mechanism
113 emergency rack insertion port
114 reagent tray
115 reagent ID reader
116 reagent loader
118 display unit
120 control unit
121 spectrophotometer
122 sample container, child sample container
150 sample pretreatment device
152 plugging unit
153 sample storage unit
154 holder stacker
155 sample insertion unit
156 centrifugal separation unit
157 liquid volume measurement unit
158 unplugging unit
159 child sample container preparation unit
161 transfer unit
163 operation unit PC
165 dispensing unit
166 sample holder (conveyed object)
167 third conveying line
200 sample analysis system

What is claimed is:

1. A conveying device, comprising:
a conveyed object having a magnet or a magnetic material; and
an electromagnet unit formed by coiling wire around teeth comprised of a magnetic material,
wherein the conveying device has a recess on a surface of each of the teeth facing the conveyed object,
wherein the surface of each of the teeth that faces the conveyed object comprises a first facing surface close to the conveyed object and a second facing surface far from the conveyed object, and
wherein the second facing surface is formed linearly.

2. The conveying device according to claim 1,
wherein the surface of each of the teeth that faces the conveyed object comprises a first facing surface close to the conveyed object and a second facing surface far from the conveyed object, and
wherein the second facing surface comprises a plurality of surfaces that radially extend from a center to an outer diameter side.

3. A sample analysis system having a conveying device according to claim 1,
wherein the conveyed object is a holder or a rack to retain a sample container.

4. A conveying device, comprising:
a conveyed object having a magnet or a magnetic material; and
an electromagnet unit formed by coiling wire around teeth comprised of a magnetic material,
wherein the conveying device has a recess on a surface of each of the teeth facing the conveyed object, and
wherein the surface of each of the teeth that faces the conveyed object comprises at least two surfaces having different distances from the conveyed object.

5. A conveying device, comprising:
a conveyed object having a magnet or a magnetic material; and
an electromagnet unit formed by coiling wire around teeth comprised of a magnetic material, wherein the conveying device has a recess on a surface of each of the teeth facing the conveyed object, wherein the surface of each of the teeth that faces the conveyed object comprises a first facing surface close to the conveyed object and a second facing surface far from the conveyed object, and wherein the first facing surface is on an outer diameter side than the second facing surface.

6. The conveying device according to claim 5, wherein the surface of each of the teeth that faces the conveyed object comprises a first facing surface close to the conveyed object, a second facing surface far from the conveyed object, and a third facing surface a distance of which from the conveyed object is intermediate.

7. The conveying device according to claim 6, wherein a distance of the third facing surface from the conveyed object varies gradually from the first facing surface to the second facing surface.

* * * * *